United States Patent
Shemer (UDI) et al.

(10) Patent No.: US 9,678,728 B1
(45) Date of Patent: Jun. 13, 2017

(54) VERSION COMPATIBILITY

(75) Inventors: Jehuda Shemer (UDI), Kfar Saba (IL); Alex Solan, Hertzliya (IL); Saar Cohen, Mishmeret (IL); Assaf Natanzon, Tel Aviv (IL); Nir Shasha, Holon (IL); Ron Pantofaro, Rishon Lezion (IL)

(73) Assignee: EMC International Company, Hamilton (BM)

( * ) Notice: Subject to any disclaimer, the term of this patent is extended or adjusted under 35 U.S.C. 154(b) by 0 days.

(21) Appl. No.: 13/434,425

(22) Filed: Mar. 29, 2012

(51) Int. Cl.
*G06F 9/45* (2006.01)

(52) U.S. Cl.
CPC .............. *G06F 8/443* (2013.01); *G06F 8/447* (2013.01)

(58) Field of Classification Search
CPC .................................. G06F 8/443; G06F 8/447
USPC ........................................ 717/160, 140, 159
See application file for complete search history.

(56) References Cited

U.S. PATENT DOCUMENTS

| | | | | |
|---|---|---|---|---|
| 5,878,246 A * | 3/1999 | Hildenbrand | ....... | G06F 13/4004 703/27 |
| 5,905,892 A * | 5/1999 | Nielsen | ...................... | G06F 8/30 714/35 |
| 7,415,706 B1 * | 8/2008 | Raju | ................... | G06F 9/44536 717/170 |
| 7,600,219 B2 * | 10/2009 | Tsantilis | ..................... | G06F 8/71 707/999.202 |
| 7,861,239 B2 * | 12/2010 | Mayfield | ............. | G06F 11/1433 717/168 |
| 8,091,076 B2 * | 1/2012 | Brown | ...................... | G06F 8/52 717/136 |
| 8,418,163 B2 * | 4/2013 | Connolly | .................. | G06F 8/65 713/100 |
| 8,522,135 B2 * | 8/2013 | Rasmussen | ........... | G06F 17/227 715/234 |
| 2004/0015890 A1 * | 1/2004 | Wong | ................ | G06F 17/30076 717/137 |
| 2004/0078781 A1 * | 4/2004 | Novy | ....................... | G06F 8/41 717/114 |
| 2005/0086642 A1 * | 4/2005 | Runte | ...................... | G06F 8/71 717/122 |
| 2005/0190203 A1 * | 9/2005 | Gery | ..................... | G06F 9/4443 345/660 |
| 2006/0075398 A1 * | 4/2006 | Bennett | .................... | G06F 8/61 717/170 |
| 2007/0150855 A1 * | 6/2007 | Jeong | ........................ | G06F 8/36 717/106 |
| 2009/0070500 A1 * | 3/2009 | Suomela | .............. | G06F 9/44505 710/62 |

(Continued)

OTHER PUBLICATIONS

IBM Tech note, located at: http://www-01.ibm.com/support/docview.wss?uid=swg21088129 Date: Jul. 18, 2003.*

(Continued)

*Primary Examiner* — Wei Zhen
*Assistant Examiner* — Hossain Morshed
(74) *Attorney, Agent, or Firm* — Krishnendu Gupta; Joseph J. D'Angelo

(57) ABSTRACT

A method, system, and program product for creating compatibility between two program interfaces comprising determining differences the interfaces; and generating code to create a compatibility layer between the first interface and second interface based on the differences between the interfaces.

20 Claims, 15 Drawing Sheets

(56) References Cited

U.S. PATENT DOCUMENTS

2010/0325167 A1* 12/2010 Landry ............... G06F 11/1446
707/802
2011/0078674 A1* 3/2011 Ershov ..................... G06F 8/75
717/170

OTHER PUBLICATIONS

NPL-Aftab-Glue code compilation-2010, Document title: "Procom@mdh Design Description" version 2.0, located at http://studylib.net/doc/8458803/1.1-purpose-of-this-document, Revised in 2010.*

* cited by examiner

WSDL File Version 1.0  215
<?xml version="1.0" encoding="utf-8"?>
<wsdl:definitions xmlns:soap="http://schemas.xmlsoap.org/wsdl/soap/"
xmlns:tm="http://microsoft.com/wsdl/mime/textMatching/"
xmlns:soapenc="http://schemas.xmlsoap.org/soap/encoding/"
xmlns:mime="http://schemas.xmlsoap.org/wsdl/mime/"
xmlns:tns="http://demo.org/" xmlns:s=http://www.w3.org/2001/XMLSchema
 xmlns:soap12="http://schemas.xmlsoap.org/wsdl/soap12/"
xmlns:http="http://schemas.xmlsoap.org/wsdl/http/"
targetNamespace="http://demo.org/" xmlns:wsdl="http://schemas.xmlsoap.org/wsdl/">
  <wsdl:types>
    <s:schema elementFormDefault="qualified" targetNamespace="http://demo.org/">
      <s:element name="Echo">
        <s:complexType>
          <s:sequence>
            <s:element minOccurs="0" maxOccurs="1" name="msg" type="s:string" />
          </s:sequence>
        </s:complexType>
      </s:element>
      <s:element name="EchoResponse">
        <s:complexType>
          <s:sequence>
            <s:element minOccurs="0" maxOccurs="1" name="EchoResult" type="s:string" />
          </s:sequence>
        </s:complexType>
      </s:element>
      <s:element name="Calculate">
        <s:complexType>
          <s:sequence>
            <s:element minOccurs="1" maxOccurs="1" name="x" type="s:int" />
            <s:element minOccurs="1" maxOccurs="1" name="y" type="s:int" />
          </s:sequence>
        </s:complexType>
      </s:element>
      <s:element name="CalculateResponse">
        <s:complexType>
          <s:sequence>
            <s:element minOccurs="1" maxOccurs="1" name="CalculateResult" type="s:int" />
          </s:sequence>
        </s:complexType>
      </s:element>
```

FIG. 2A

```
<s:element name="SetConfig">
   <s:complexType>
     <s:sequence>
       <s:element minOccurs="0" maxOccurs="1" name="cfg" type="tns:Config" />
     </s:sequence>
   </s:complexType>
 </s:element>
 <s:complexType name="Config" />
 <s:element name="SetConfigResponse">
   <s:complexType>
     <s:sequence>
       <s:element minOccurs="1" maxOccurs="1" name="SetConfigResult" type="s:int" />
     </s:sequence>
   </s:complexType>
 </s:element>
 </s:schema>
</wsdl:types>
<wsdl:message name="EchoSoapIn">
 <wsdl:part name="parameters" element="tns:Echo" />
</wsdl:message>
<wsdl:message name="EchoSoapOut">
 <wsdl:part name="parameters" element="tns:EchoResponse" />
</wsdl:message>
<wsdl:message name="CalculateSoapIn">
 <wsdl:part name="parameters" element="tns:Calculate" />
</wsdl:message>
<wsdl:message name="CalculateSoapOut">
 <wsdl:part name="parameters" element="tns:CalculateResponse" />
</wsdl:message>
<wsdl:message name="SetConfigSoapIn">
 <wsdl:part name="parameters" element="tns:SetConfig" />
</wsdl:message>
<wsdl:message name="SetConfigSoapOut">
 <wsdl:part name="parameters" element="tns:SetConfigResponse" />
</wsdl:message>
<wsdl:portType name="Service1Soap">
 <wsdl:operation name="Echo">
   <wsdl:input message="tns:EchoSoapIn" />
   ...
```

FIG. 2B

```
Service V1.asmx.cd 415
using System;
using System.Data;
using System.Configuration;
using System.Web;
using System.Web.Security;
using System.Web.UI;
using System.Web.UI.WebControls;
using System.Web.UI.WebControls.WebParts;
using System.Web.UI.HtmlControls;

namespace APIClient
{
   public class ServiceV1Interface
   {
      ServiceV1.Service1 getSvc()
      {
         return new ServiceV1.Service1();
      }

//Generated from the ServiceV1 wsdl
      public string Echo(string msg)
      {
         return getSvc().Echo(msg);
      } public int Calculate(int x, int y)
      {
         return getSvc().Calculate(x, y);
      } public int SetConfig(ServiceV1.Config cfg)
      {
         return getSvc().SetConfig(cfg);
      }
   }
}
```

FIG. 4A

```
Service V2.asmx.cd 425
using System;
using System.Data;
using System.Configuration;
using System.Web;
using System.Web.Security;
using System.Web.UI;
using System.Web.UI.WebControls;
using System.Web.UI.WebControls.WebParts;
using System.Web.UI.HtmlControls;

namespace APIClient
{
   public class ServiceV2Interface
   {
      ServiceV2.Service1 getSvc()
      {        return new ServiceV2.Service1();      }
      ServiceV2_to_ServiceV1 getPrevInterface()
      {        return new ServiceV2_to_ServiceV1();     }
      //Generated from the ServiceV2 wsdl
      public string Echo(string msg)
      {        if (ConnectionVersion == ServiceV2.version)
         return getSvc().Echo(msg);
       else
         return getPrevInterface().Echo(msg);     }
      public int Calculate(int x, int y, int z)
      {        if (ConnectionVersion == ServiceV2.version)
         return getSvc().Calculate(x, y, z);
       else
         return getPrevInterface().Calculate(x, y, z);    }
      public double CalculateNew(double a, double b)
      {     if (ConnectionVersion == ServiceV2.version)
         return getSvc().CalculateNew(a, b);
       else
         return getPrevInterface().CalculateNew(a, b);    }
      public int SetConfig(ServiceV2.Config cfg)
      {        if (ConnectionVersion == ServiceV2.version)
         return getSvc().SetConfig(cfg);
        else
         return getPrevInterface().SetConfig(cfg);    }
   }
}
```

FIG. 4B

```
Service V2 to V1 generated 615
using System;
using System.Data;
using System.Configuration;
using System.Web;
using System.Web.Security;
using System.Web.UI;
using System.Web.UI.WebControls;
using System.Web.UI.WebControls.WebParts;
using System.Web.UI.HtmlControls;

namespace APIClient
{
   public class ServiceV2_to_ServiceV1
   {
      public ServiceV1Interface getInterface()
      {        return new ServiceV1Interface();     }
      //Generated from the ServiceV2 wsdl
      public string Echo(string msg)
      {        return getInterface().Echo(msg);     }
      public int Calculate(int x, int y, int z)
      {        return getInterface().Calculate(x, y, z);    }
      public double CalculateNew(double a, double b)
      {        return getInterface().CalculateNew(a, b);    }
      public int SetConfig(ServiceV2.Config cfg)
      {
        ServiceV1.Config cfg_conv;
        translate(cfg, cfg_conv);
        return getInterface().SetConfig(cfg_conv);
      }
      public void translate(ServiceV2.Config cfg_from, ServiceV1.Config cfg_to)
      {
        cfg = new ServiceV1.Config(cfg_from.value, cfg_from.name,
        cfg_from.IPAddress, cfg_from.SubnetMask);
      }
   }
}
```

FIG. 6

```
ServiceV2 to Service V1 fixed 815
using System;
using System.Data;
using System.Configuration;
using System.Web;
using System.Web.Security;
using System.Web.UI;
using System.Web.UI.WebControls;
using System.Web.UI.WebControls.WebParts;
using System.Web.UI.HtmlControls;

namespace APIClient
{
   public class ServiceV2_to_ServiceV1
   {
      public ServiceV1Interface getInterface()
      {        return new ServiceV1Interface();    }
      public string Echo(string msg)
      {        return getInterface().Echo(msg);    }
      public int Calculate(int x, int y, int z)
      {        //ignore the z parameter
         return getInterface().Calculate(x, y);     }
      public double CalculateNew(double a, double b)
      {        //make compatible
         int a_conv = (int)a;
         int b_conv = (int)b;
         return getInterface().Calculate(a_conv, b_conv);      } public int SetConfig(ServiceV2.Config cfg)
      {
         ServiceV1.Config cfg_conv;
         translate(cfg, cfg_conv);
         return getInterface().SetConfig(cfg_conv);
      }
      public void translate(ServiceV2.Config cfg_from, ServiceV1.Config cfg_to)
      {
         //removed the subnet mask parameter
         cfg = new ServiceV1.Config(cfg_from.value, cfg_from.name, cfg_from.IPAddress);
      }
   }
}
```

FIG. 8

VERSION COMPATIBILITY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to version compatibility.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for creating compatibility between two program interfaces comprising determining differences between the interfaces; and generating code to create a compatibility layer between the first interface and second interface based on the differences between the interfaces.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 2a and 2b are a simplified illustration of a WSDL which may be used to define an interface, in accordance with an embodiment of the present disclosure;

FIGS. 4a and 4B are simplified illustrations of an interface that may be generated from a definitions file for two different versions of software, in accordance with an embodiment of the present disclosure;

FIG. 6 is a simplified illustration of errors generated during a compare between the interfaces of two different versions, in accordance with an embodiment of the present disclosure;

FIG. 8 is a simplified illustration of a compatibility layer generated to translate between the interfaces of two different versions, in accordance with an embodiment of the present disclosure;

DETAILED DESCRIPTION

Figure 1:
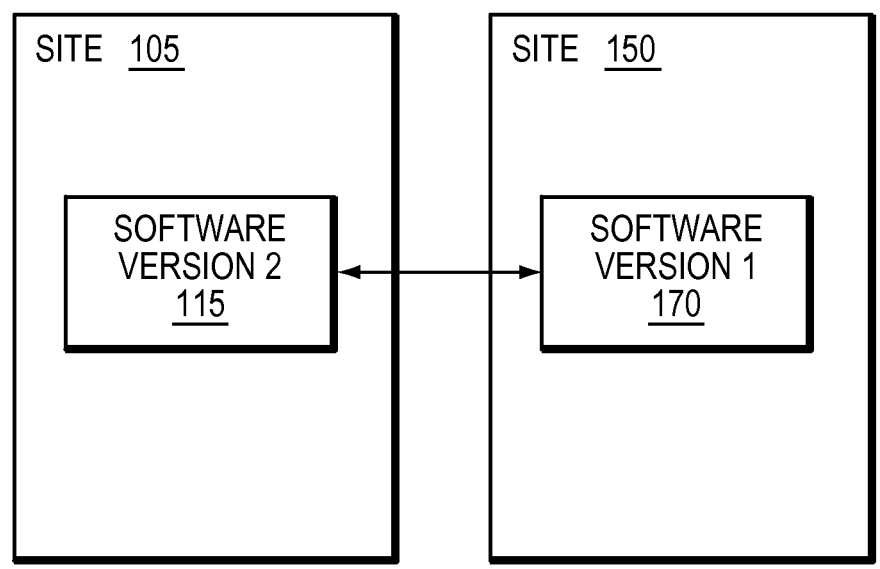
FIG. 1 is a simplified illustration of a two software programs communicating, in accordance with an embodiment of the present disclosure.

Generally, there are many programs, such as web servers, back-up programs, mirroring programs, and journaling type redundancy programs that may communicate with each other. Typically, new versions of software have new and different software features than previous versions. Usually, this can cause compatibility problems between two different versions of software communicating with each other. Generally, this may be because the Application program interface, communication protocol, and or program functionality may have changed between the versions and the versions may not be backward compatible. In some embodiments, transport conversion may require translation of different protocols. Conventionally, different versions present syntactic, semantic and per feature layers problems when attempting to work together.

Generally there are not well defined interfaces between program versions. Usually, there are internal classes and objects passed between the programs of different versions. Conventionally, fields added or modified in classes between versions are transferred to the other program even if they are not relevant or used in the different version. Generally, creating full interoperability between software versions has required a performance hit to do the conversion and requires a substantial investment in developer time.

In certain embodiments, techniques of the current disclosure enable different versions of software to function with each other when the different versions of software have different programming and communication interfaces. In some embodiments, the current techniques may remove syntactic issues and provide infrastructure to resolve some of the semantic issues.

In certain embodiments, a version of the software code or program may have no knowledge of another software code or version. In some embodiments, a compatibility layer may be created to communicate between the software versions. In at least some embodiments, the software compatibility layer may represent a scan of the code functionality of a first version of the software programs. In most embodiments, a particular version may have no knowledge about the other version of the code. In further embodiments, the compatibility layer may be generated for several different versions of the software. As used herein, versions, software, and software versions, may refer to any type of software at a given version that communicates with other software or version. In certain embodiments, the communication between software may be direct invocation or remote procedure calls. In at least some embodiments, the communicating software may be on the same computer or on different computers. In alternative embodiments, the communicating software may be on one or more virtual machines or virtual servers.

In some embodiments, different program versions may have different functions, may have similar functions with different parameter values, functions with different numbers of parameters, and may have functions with similar functionality with different names. In certain embodiments, these functions may be represented by a definition file and a functionality file. In most embodiments, the definition file may define the number and type of parameters the function has when it is called. In particular embodiments, the definition file may specify the range of values that may be accepted for a parameter. In certain embodiments, the definition file may define the data types that appear as parameters. In most embodiments, the data types may be simple types, classes, structures or arrays and compositions of such types. In at least some embodiments, the definitions file may be used to generate the functionality basic functionality for the data types such as constructors, accessors, operators and serialization functionality.

In at least one embodiment, the definition file from an earlier version of a program may be used to compile with a future version of the program. In some embodiments, the definition file may be used to create code for data types and functional interfaces that match the earlier version. In certain embodiments, given the version definition files and an earlier version definition files, code may be generated for a compatibility layer that may convert between the data structures of the different versions and interfaces between the functions of the different versions. In some embodiments, the compilation of the compatibility layer code generated from a definition file of a previous version may create a set of compile errors where the versions are incompatible. In certain embodiments, the set of compile errors may be use to fix the generated compatibility layer code to correctly convert interface for one version of the program to another version of the program. In further embodiments, when communication occurs between versions, the compatibility layer may be use to translate the communication from one software version to another. In at least some embodiments, the translation may include, in addition to the previous described data type and functional conversions, protocol changes, serialization changes, default values, constants and constraints enforcements. In certain embodiments, the communication between software may identify the version of the software and may use this identification to automatically select the correct version of interface to use.

In some embodiments, the interface definition files may use standard industry formats such as SOAP/WSDL, XML, IDL or other interface and web-service definition languages. In certain embodiments, the definition files may be in a proprietary format. In other embodiments, these files may be fed into code generators to create the described data types, functions and create the compatibility layers between versions of these interfaces.

In some embodiments, protocol selections may not be part of the definition file and may be detected. In certain embodiments, examples of protocol selections may include the introduction of security, compression and encryption schemes in web service interfaces. In some embodiments, the protocols may differ between versions but may be detected online. In certain embodiments, by adding these to the definition files or via additional parameters code may be generated to bridge compatibility gaps to older versions and may allow old versions to use newer communication features in newer versions without breaking the compatibility.

In a particular embodiment, assume that there is a Version 1 and it is desired to be compatible with Version 2. In this embodiment, the interface for Version 2 may be been defined. In this embodiment, the interface for Version 1 may be defined in a set of WSDL and XSD files. In this embodiment, the XSD defines the data types and structures of the interface. In this embodiment, the WSDL file defines the webservice functional interface.

In this embodiment, Version 2 may have a different interface than Version 1. In this embodiment Version 2 may have different WSDL and XSD files than Version 1. In this embodiment, there may be access to the source code to both the Version 1 and Version 2 interface. In certain embodiments, it may be desired to be able to use both the Version 1 interface and the Version 2 interface with Version 2 software. In certain embodiments, the WSDL and XSD files of Version 1, used for the interface files, may be included or copied to the code base of Version 2. In some embodiments, the WSDL and XSD files of Version 1 may be used to generate code compiled with the code of Version 2. In most embodiments, XSD files may be used to generate code to create the members, constructors and serialization functions and some new conversion methods described shortly.

In most embodiments, the code generated from the Version 1 definition files may be used to create a compatibility layer with the Version 2 software. In at least some embodiments, the methods in the generated files maybe able to convert between Version 1 and Version 2 software and may have knowledge of both interfaces. In most embodiments, a base version of these conversion methods may be created automatically. In some embodiments, if no changes were made between the versions, then no work may need to be done for that class. In at least some embodiments, if a change occurred between the versions (for example a member was added) a compiler error may occur in the auto created method. In at least some embodiments, certain changes such as add/modify/remove of members may be identified at compile time.

Refer now the example embodiment of FIG. 1. In the example embodiment of FIG. 1, there are two sites, sites 105 and 150. Site 1 has software version 2 115 which communicates with software version 1 170 at site 150. Refer as well to the example embodiment of FIG. 2. The example embodiment of FIG. 2 illustrates WSDL File Version 1.0 215, which represents the functional information about the communication protocol for software version 1 170 at site 150.

Figure 3:
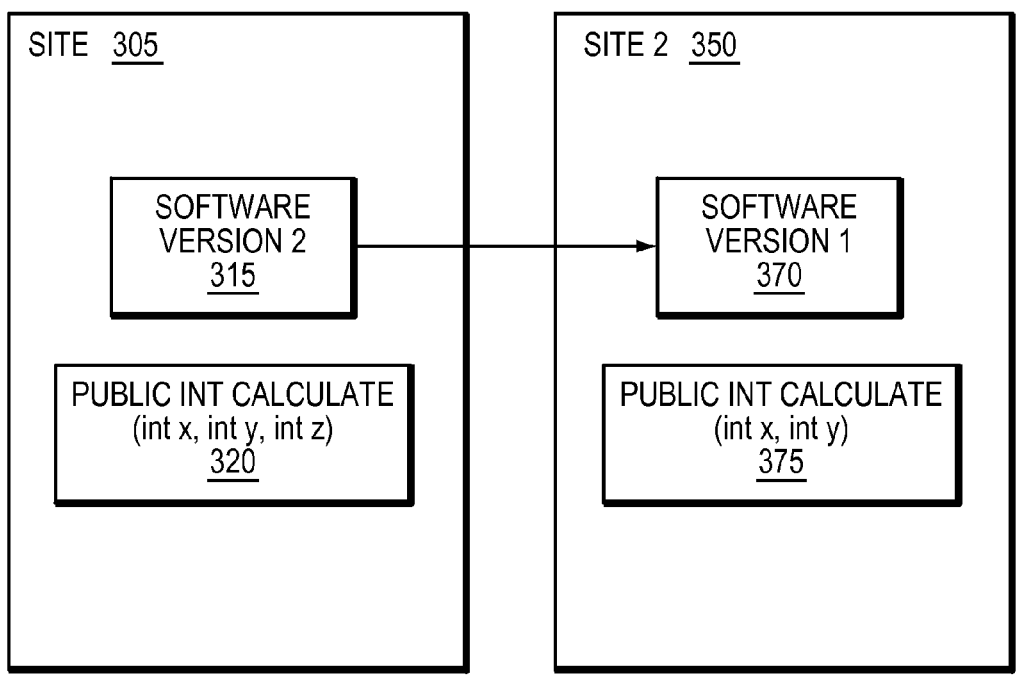
FIG. 3 is a simplified illustration of two different versions of a software program with different interfaces, in accordance with an embodiment of the present disclosure.
Figure 5:
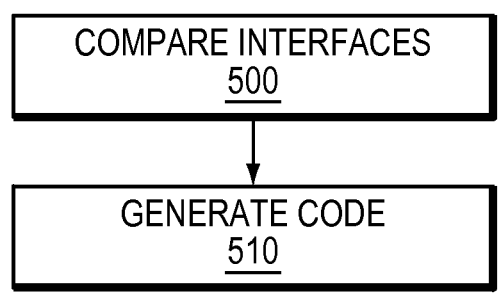
FIG. 5 is a simplified method of determining changes between interfaces for two different versions of software, in accordance with an embodiment of the present disclosure.
Figure 7:
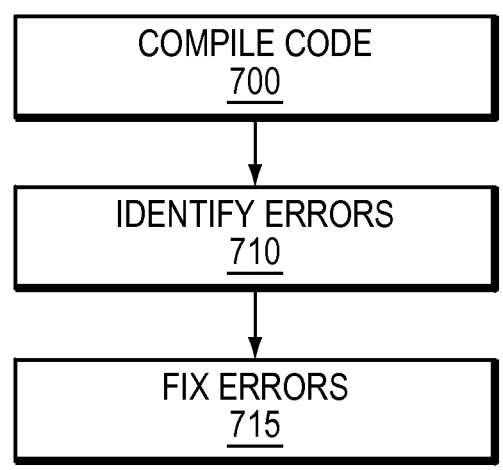
FIG. 7 is an alternative simplified method of determining changes between interfaces for two different versions of software, in accordance with an embodiment of the present disclosure.
Figure 9:
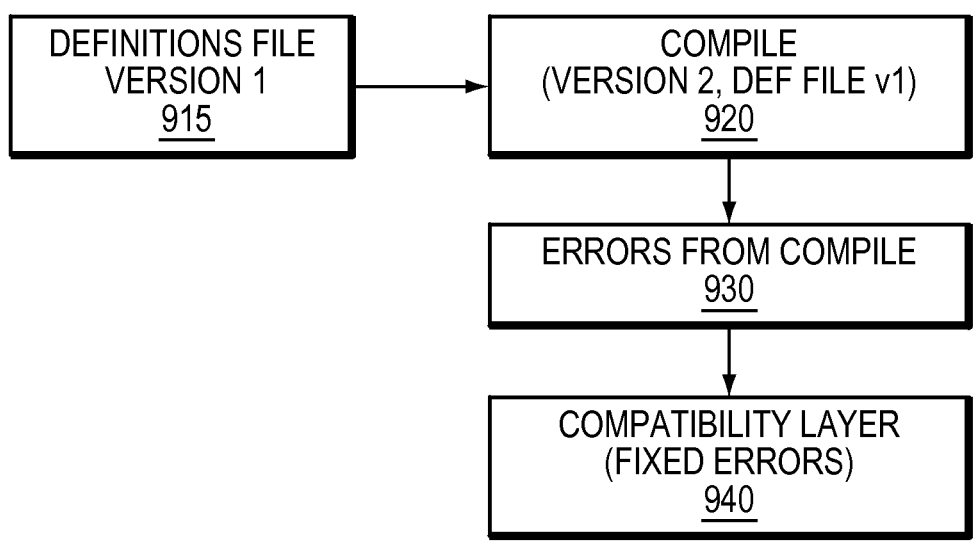
FIG. 9 is an further simplified method of determining changes between interfaces for two different versions of software, in accordance with an embodiment of the present disclosure.

Refer now to the example embodiment of FIG. 3. If Software version 2 315 was to communicate with software version 1 370, there may be a problem. Software version 2 315 has Calculate function 320 that requires three parameters. Software version 1 370 has Calculate function 375 which takes two parameters. In this embodiment, the number of parameters are different and if Software version 2 315 were to call calculate on software version 1 370, an error would occur.

Further refer as well to the example embodiments of FIGS. 4a and 4b. These example embodiments represents the functional interface for the Software. Services V1 415 represents the functional information generated from the WSDL file of FIG. 2. Services V2 represents the functional information generated from a WSDL file to arrive at the functionality for Software 2 375.

Refer now to the example embodiments of FIGS. 4a and b, 5 and 6. The differences between interfaces 415 and 425 for software versions may be determined (step 500). Code 610 may be generated based on the comparison (step 510). Refer now as well to the embodiments of FIGS. 2, 7, 8, and 9. Definitions file 915, such as wsdl file 215, may be used to compile the software version 2 315 with definitions file 915 to create comparison file 930, such as compilation file 615 (step 700). Errors 930 in the compilation may be identified (step 710). The errors may be fixed to create compatibility functionality layer 940, such as compatibility layer 815 (step 715).

Translation Between Versions

Figure 10:
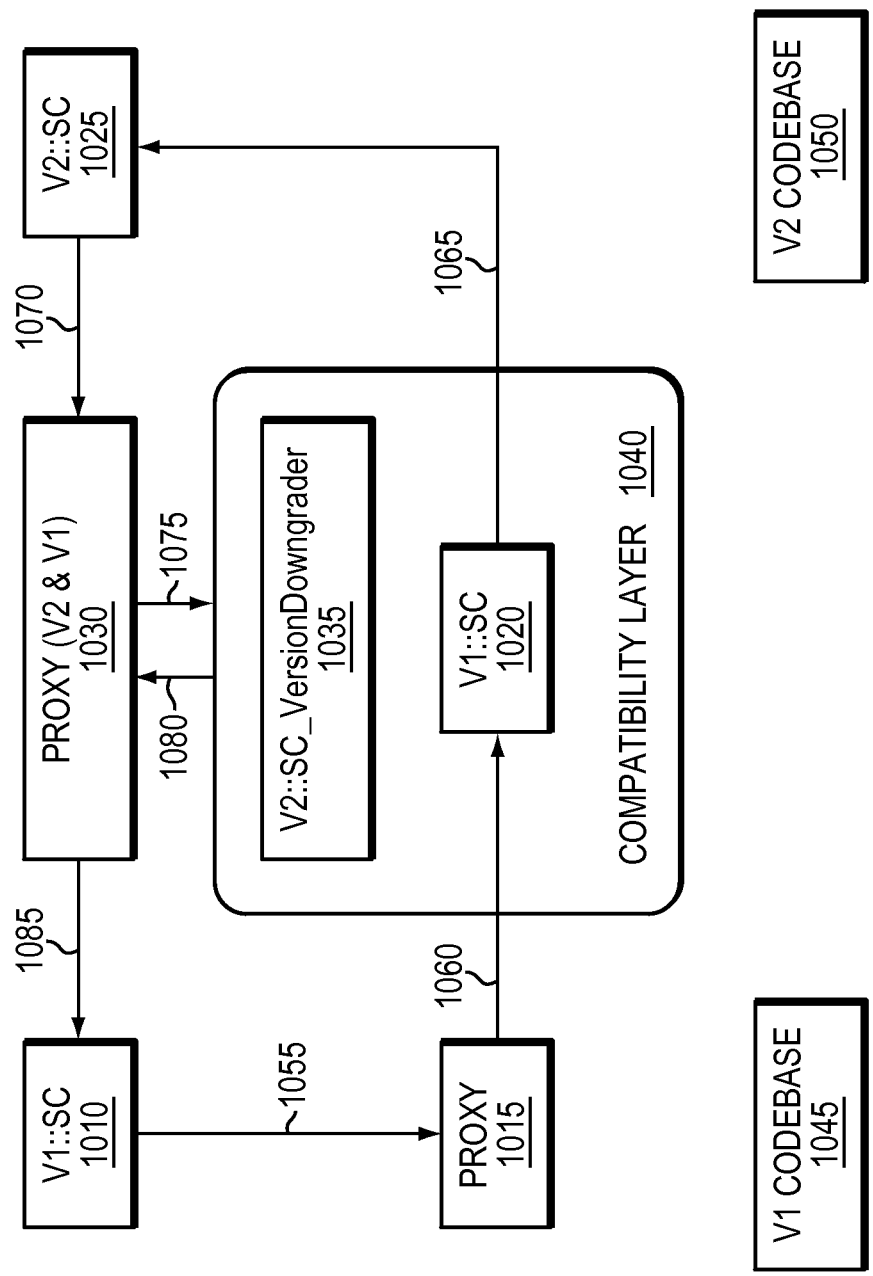
FIG. 10 is a simplified illustration of a compatibility layer translating communications between the interfaces of two different software versions, in accordance with an embodiment of the present disclosure.
Figure 11:
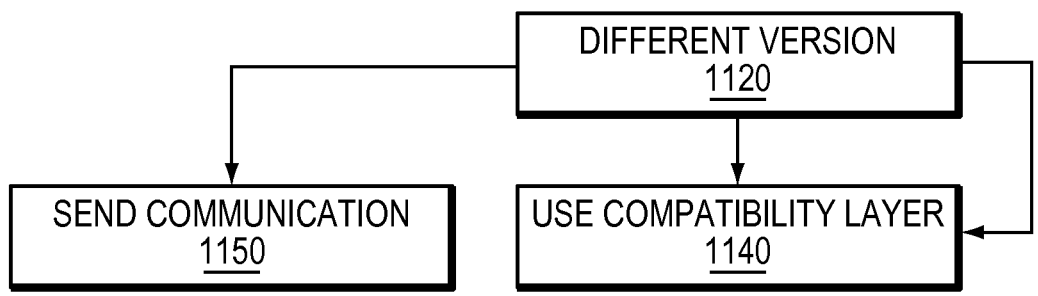
FIG. 11 is a simplified method of translating between two different versions of software, in accordance with an embodiment of the present disclosure.

Refer now to the example embodiments of FIGS. 10 and 11, which illustrate sample embodiments using a compatibility layer. Incoming calls from Version 1 1010 to version 2 1025 include 1055, 1060, and 1065. Outgoing calls between version 2 1025 include 1070, 1075, 1080, and 1085. Incoming and outgoing calls are routed through compatibility layer 1040. FIG. 10 illustrates version 1 1010 sending a communication 1055 through proxy 1015. In this embodiment, the communication is sent from version 1 1010 with no changes. Compatibility layer 1040 receives the communication from version 1 101 through proxy 1015. Compatibility layer 1040 determines the message is from a different version than version 2 (step 1110). Compatibility layer 1040 uses the appropriate functional call to translate the information from a version 1 communication to a version 2 communication (step 1140). In certain embodiments, compatibility layer 1040 may check to see if an additional translation is needed and steps 1120 and 1140 may be repeated. In some embodiments, this may include adding an additional default parameter or typecasting a value. Compatibility layer 1040 sends the communication 1065 to Version 2 1025.

Version 2 1025 sends a message 1070 to proxy 1030. Proxy 1030 determines version 2 1025 is communicating to version 1010. Proxy 1030 sends message 1075 to compatibility layer 1040. Compatibility layer 1040 uses downgrader 1035 to downgrade the message to a version 1 message. Downgrader 1035 sends the message 1080 to Proxy 1030. Proxy 1030 sends the downgraded message 1085 to version 1 1010. In this embodiment, neither Version of the software needs to be aware that it is working with another version of the software.

Figure 12:
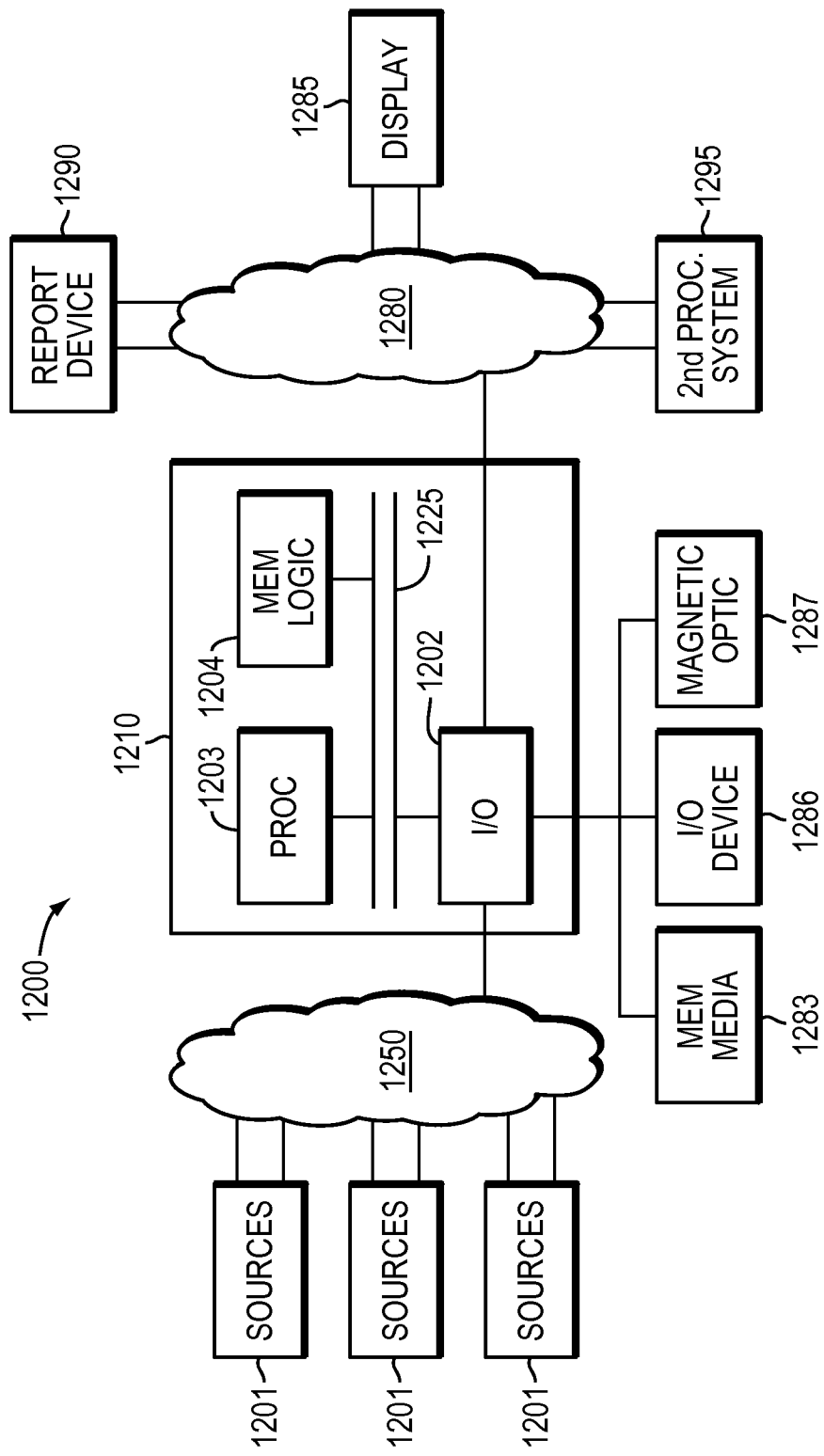
FIG. 12 is an example of an embodiment of an apparatus that may utilize the techniques described herein, in accordance with an embodiment of the present disclosure.
Figure 13:
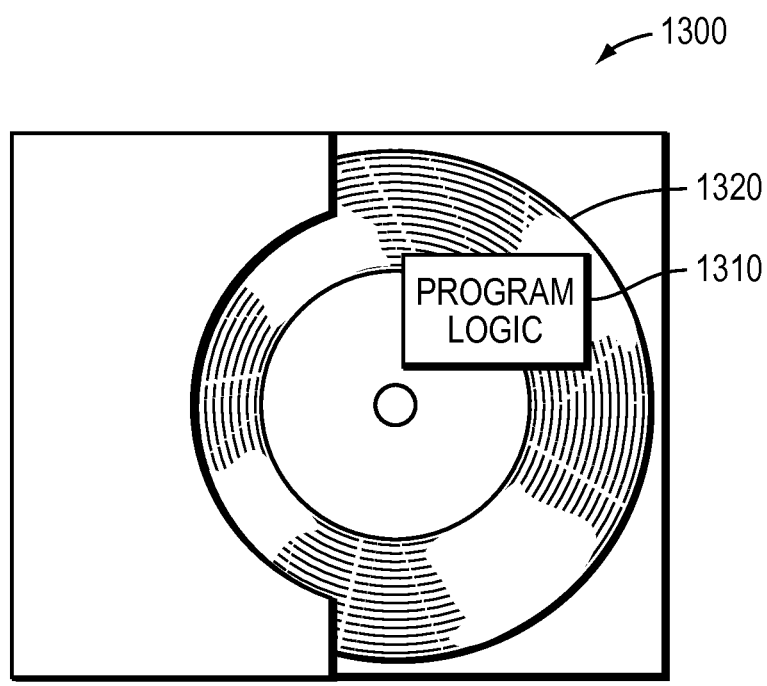
FIG. 13 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor 1203 to provide a unique apparatus that operates analogously to specific logic circuits. As such a general purpose digital machine can be transformed into a special purpose digital machine. FIG. 13 shows Program Logic 1334 embodied on a computer-readable medium 1330 as shown, and wherein the Logic is encoded in computer-executable code configured for carrying out the reservation service process of this invention and thereby forming a Computer Program Product 1300. The logic 1334 may be the same logic 1240 on memory 1204 loaded on processor 1203. The program logic may also be embodied in software modules, as modules, or as hardware modules. The program logic and or processors may be in or performed by virtual processors, virtual machines, and virtual servers.

The logic for carrying out the method may be embodied as part of the system described below, which is useful for carrying out a method described with reference to embodiments shown in, for example, FIG. 1 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method for creating compatibility between a program interface for a first version of a software program and a second interface for a second version of the software program:
   determining differences between first interface for the first version of the software program and second interface for the second version of the software program using metadata of the first interface; wherein the differences denote incompatibilities between the first interface of the software and the second interface of the software; and
   generating code to create a compatibility layer, independent of and enabled to be communicatively coupled to the first interface of a first instance of the first version of the software program and the second interface of a second instance of the second version software program based on the differences between the interfaces, wherein the compatibility layer enables communication between the first interface of the first version of the software program and the second interface of the second version of the software program to overcome a first set of incompatibilities between the first interface of the software and the second interface of the software by translating a communication of the first interface to a communication of the second interface; wherein generation of the compatibility layer includes compiling a definition file from the first version of the software program with the second version of the software program to create functional interfaces that match the first version;
   compiling the code of the compatibility layer; wherein each of a second set of incompatibilities between the first interface of the software and the second interface of the software generates a respective error in the compiling of the code of the compatibility layer;
   identifying the respective errors from the compiling of the code of the compatibility layer; and
   creating a fix to overcome the second set of incompatibilities corresponding to the respective errors generated during the compilation of the compatibility layer to enable the compatibility layer to convert communication between the first interface and the second interface to enable the first version of the software program to communicate with the second version of the software program by using the compatibility layer as a proxy between versions of the software.

2. The method of claim 1 wherein the complication of the compatibility layer code is generated from a definitions file of a previous version of the software program; wherein converting communication between versions of the software program includes determining the version of the interface of the software program sending the request and determining the version of the interface of the software receiving the request.

3. The method of claim 1 wherein the compatibility layer enables conversion between data type and functional type differences between two interfaces of two versions of the software program.

4. The method of claim 3 wherein the compatibility layer further enables conversion between transport conversions for different version of the software program.

5. The method of claim 4 wherein at least one transport conversion is selected from the group consisting of serialization and transfer protocol.

6. The method of claim 1 further comprising:
   determining differences between a third interface for a third version of the software and the first interface for the first version of the software;
   determining differences between the second interface for the second version of the software using metadata of the third interface for the third version of the software and the second interface for the second version of the software; and
   generating code for the compatibility layer for compatibility between the third interface and the first interface and generating further code for the compatibility layer for compatibility between the second interface and the third interface, wherein the generating is based on the differences between the interfaces, wherein the compatibility layer enables communication between the first interface for the first version of the software and the second interface for the second version of the software; the first interface for the first version of the software and the third interface for the third version of the software, and the second interface for the second version of the software and the third interface for the third version of the software;
   compiling the code of the compatibility layer; wherein each incompatibility between the third interface and each of the first interface and second interface generates a respective error in the compiling of the code;
   identifying the respective errors from the compiling of the code of the compatibility layer; and
   creating a fix for the respective errors generated during the compilation to enable the compatibility layer to convert communication between the third interface and each of the first interface and the second interface.

7. The method of claim 1 where the metadata is the definition file for the code of the first interface and wherein the second interface is compiled with the definition file of the first interface to generate the errors.

8. A computer program product comprising:
   a non-transitory computer readable medium encoded with computer executable program code, the code configured to enable the execution of:
   determining differences between a first interface for a first version of a software program and a second interface for a second version of the software program using metadata of the first interface: wherein the differences denote incompatibilities between the first interface of the software and the second interface of the software; and
   generating code to create a compatibility layer, independent of and enabled to be communicatively coupled to the first interface of a first instance of the first version of the software program and the second interface of a second instance of the second version software program, based on the differences between the interfaces, wherein the compatibility layer enables communication between the first interface of the first version of the software program and the second interface of the second version of the software program to overcome a first set of incompatibilities between the first interface of the software and the second interface of the software by translating a communication of the first interface to a communication of the second interface; wherein generation of the compatibility layer includes compiling a definition file from the first version of the software program with the second version of the software program to create functional interfaces that match the first version;

compiling the code of the compatibility layer; wherein each of a second set of incompatibilities between the first interface of the software and the second interface of the software generates a respective error in the compiling of the code of the compatibility layer;

identifying the respective errors from the compiling of the code of the compatibility layer; and creating a fix to overcome the second set of incompatibilities corresponding to the respective errors generated during the compilation of the compatibility layer to enable the compatibility layer to convert communication between the first interface and the second interface to enable the first version of the software program to communicate with the second version of the software program by using the compatibility layer as a proxy between versions of the software.

9. The computer product of claim 8 wherein the complication of the compatibility layer code is generated from a definitions file of a previous version of the software program; wherein converting communication between version of the software program includes determining the version of the interface of the software program sending the request and determining the version of the interface of the software receiving the request.

10. The computer product of claim 8 wherein the compatibility layer enables conversion between data type and functional type differences between two interfaces of two versions of the software program.

11. The computer product of claim 10 wherein the compatibility layer further enables conversion between transport conversions for two versions of the software program.

12. The computer product of claim 11 wherein at least one transport conversion is selected from the group consisting of serialization and transfer protocol.

13. The computer program product of claim 8, the code further configured to enable the execution of:

determining differences between a third interface for a third version of the software and the first interface for the first version of the software;

determining differences between the second interface using metadata of the third interface for the third version of the software and the second interface for the second version of the software; and generating code for the compatibility layer for compatibility between the third interface and the first interface and generating further code for the compatibility layer for compatibility between the second interface and the third interface, wherein the generating is based on the differences between the interfaces, wherein the compatibility layer enables communication between the first interface for the first version of the software and the second interface for the second version of the software; the first interface for the first version of the software and the third interface for the third version of the software, and the second interface for the second version of the software and the third interface for the third version of the software;

compiling the code of the compatibility layer; wherein each incompatibility between the third interface and each of the first interface and second interface generates a respective error in the compiling of the code;

identifying the respective errors from the compiling of the code of the compatibility layer; and creating a fix for the respective errors generated during the compilation to enable the compatibility layer to convert communication between the third interface and each of the first interface and the second interface.

14. The computer program product of claim 8 where the metadata is the definition file for the code of the first interface and wherein the second interface is compiled with the definition file of the first interface to generate the errors.

15. A system comprising:

a first interface for a first version of a software program defined by a first definition file;

a second interface for a second version of the software program defined by a second interface file; and computer-executable logic operating in memory, wherein the computer-executable program logic is configured for execution of:

determining differences between the first interface for a first version of the software program and the second interface for the second version of the software program using metadata of the first interface; wherein the differences denote incompatibilities between the first interface of the software and the second interface of the software; and generating code to create a compatibility layer, independent of and enabled to be communicatively coupled to the first interface of a first instance of the first version of the software program and the second interface of a second instance of the second version software program, based on the differences between the interfaces, wherein the compatibility layer enables communication between the first interface of the first version of the software program and the second interface of the second version of the software program to overcome a first set of incompatibilities between the first interface of the software and the second interface of the software by translating a communication of the first interface to a communication of the second interface; wherein generation of the compatibility layer includes compiling a definition file from the first version of the software program with the second version of the software program to create functional interfaces that match the first version, compiling the code of the compatibility layer wherein each of a second set of incompatibilities between the first interface of the software and the second interface of the software generates a respective error in the compiling of the code of the compatibility layer:

identifying the respective errors from the compiling of the code of the compatibility layer; and creating a fix to overcome the second set of incompatibilities corresponding to the respective errors generated during the compilation of the compatibility layer to enable the compatibility layer to convert communication between the first interface and the second interface to enable the first version of the software program to communicate with the second version of the software program by using the compatibility layer as a proxy between versions of the software.

16. The system of claim 15 wherein the complication of the compatibility layer code is generated from a definitions file of a previous version of the software program; wherein converting communication between versions of the software program includes determining the version of the interface of the software program sending the request and determining the version of the interface of the software receiving the request.

17. The system of claim 15 wherein the compatibility layer enables conversion between data type and functional type differences between two interfaces of two versions of the software program.

18. The computer product of claim 17 wherein the compatibility layer further enables conversion between transport conversions for two versions of the software program.

19. The computer product of claim 18 wherein at least one transport conversion is selected from the group consisting of serialization and transfer protocol.

20. The system of claim 15 the computer-executable program logic further configured for execution of:
   determining differences between a third interface for a third version of the software and the first interface for the first version of the software;
   determining differences between the second interface for the second version of the software using metadata of the third interface for the third version of the software and using metadata of the second interface for the second version of the software; and
   generating code for the compatibility layer for compatibility between the third interface and the first interface and generating further code for the compatibility layer for compatibility between the second interface and the third interface, wherein the generating is based on the differences between the interfaces, wherein the compatibility layer enables communication between the first interface for the first version of the software and the second interface for the second version of the software; the first interface for the first version of the software and the third interface for the third version of the software, and the second interface for the second version of the software and the third interface for the third version of the software; compiling the code of the compatibility layer; wherein each incompatibility between the third interface and each of the first interface and second interface generates a respective error in the compiling of the code; identifying the respective errors from the compiling of the code of the compatibility layer; and creating a fix for the respective errors generated during the compilation to enable the compatibility layer to convert communication between the third interface and each of the first interface and the second interface.

* * * * *